Figure 1:
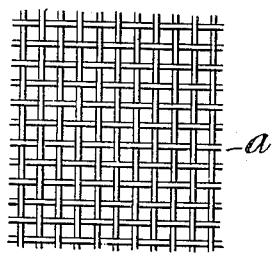

H. S. WILLIAMS.
SCREEN FOR OPTICAL PROJECTION PURPOSES AND METHOD OF MAKING SAME.
APPLICATION FILED FEB. 24, 1912.

1,043,988.

Patented Nov. 12, 1912.

WITNESSES
Thomas M. Smith
Helen F. Miller

INVENTOR
BY Henry S. Williams,
Walter Douglass.
ATTORNEY

UNITED STATES PATENT OFFICE.

HENRY S. WILLIAMS, OF PHILADELPHIA, PENNSYLVANIA, ASSIGNOR, BY DIRECT AND MESNE ASSIGNMENTS, OF ONE-HALF TO WILLIAMS, BROWN AND EARLE, INC., OF PHILADELPHIA, PENNSYLVANIA, A CORPORATION OF PENNSYLVANIA, AND ONE-HALF TO JOSEPH BANCROFT & SONS COMPANY, OF WILMINGTON, DELAWARE, A CORPORATION OF DELAWARE.

SCREEN FOR OPTICAL PROJECTION PURPOSES AND METHOD OF MAKING SAME.

1,043,988.    Specification of Letters Patent.    Patented Nov. 12, 1912.

Application filed February 24, 1912. Serial No. 679,623.

*To all whom it may concern:*

Be it known that I, HENRY S. WILLIAMS, a citizen of the United States, residing at the city of Philadelphia, in the county of Philadelphia and State of Pennsylvania, have invented certain new and useful Improvements in Screens for Optical Projection Purposes and Methods of Making the Same, of which the following is a specification.

My invention relates to a flexible, inseparable, homogeneous, built-up structure, for use among others, as a screen in optical projection work, the same constructively composed of a fibrous skeleton grid saturated with and the interstices filled, as well as faces covered with a chemical mixture or compound, such as baryta or china-clay, and a metallic material as silver or aluminum, with a gum or sizing, and which structure in the formation thereof finished mechanically, to provide an inseparable, homogeneous, opaque structure.

Hitherto it has been proposed to provide metallic faced screens for optical projection work with a plain surface but as a result, the brightness possessed by such 'screens over other kinds was apparent only, within somewhat limited angles of view. Further it has also been proposed to provide portable screens for optical projection work, by hand-facing with metallic foil or the like. However, such at the edges buckled and curled, thus destroying not only the evenness of the surface, but as well, their usefulness. Still further it has been proposed to overcome the defined objectionable features by applying to calico, linen, canvas or the like by hand-surfacing silver or other metallic sheets, films or leaves as well as powdered bronze spread over the surface of the sheet, to among other things, remedy buckling and curling of the screens, but such types were not water-proof and shrank unequally and therefore in practice have been found to be in many respects most unsatisfactory. And still further it has been proposed to provide a screen having a base coated with metallic particles as powdered aluminum or a colored coating of such metallic material, but even such type of screen in practice has not proven satisfactory; and therefore, to avoid the foregoing objectionable features found in screen production, among others, is the principal object of my present invention.

My invention stated in general terms, consists of an open meshed built-up, inseparable, homogeneous product, for use as a screen, composed of a fabric-grid impregnated with and having the interstices thoroughly filled in as well as both surfaces with a chemical mixture or compound containing a metallic material or bronze and a gum or sizing or both, and mechanically finished.

The nature, general scope, as well as characteristic features of my present invention will be more fully understood from the following description taken in connection with the accompanying drawings forming part hereof, in which—

Figure 2:
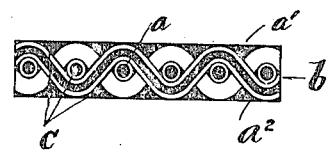
Figure 3:
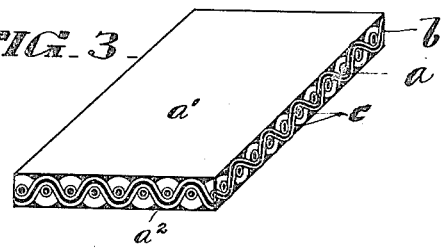
Figure 4:
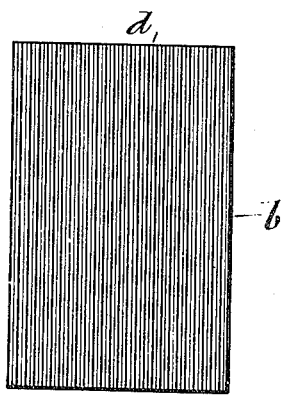
Figure 5:
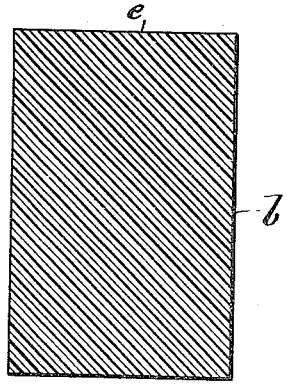
Figure 6:
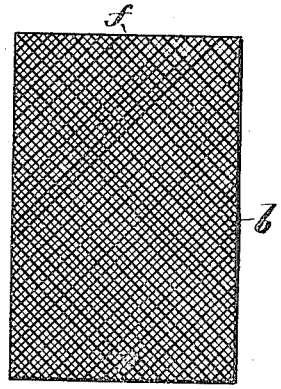

Figure 1, is a top or plan view of a piece or section of a fibrous skeleton grid onto and into which is built up, the inseparable, homogeneous, opaque structure of my said invention. Fig. 2, is a cross-sectional view enlarged, of the fabric-grid having the interstices filled with a chemical mixture or compound and a metallic material with a gum or sizing or both, showing the adhering or clinging of the composition matter to both the warps and wefts of the said fabric grid, in providing mechanically produced an inseparable, homogeneous, opaque resultant structure in contradistinction to a structure having merely a layer or a coating applied thereto. Fig. 3, is a perspective view of an oblong section of the built-up product cut from a completed roll of the same, embodying main features of my invention. Figs. 4, 5 and 6, are respectively, top or plan views of the mechanically produced composition and fabric grid structure finished in different forms, for instance, the first with vertical line embossing as a screen, in such a form adapted for reflective purposes; and in the other two instances, respectively, provided with inclining cross-line embossing and diamond-shaped embossing; the embossing operation being effected after the fabric and composition structure has been mechanically completed, by passing through suitable pressure rollers, in which the particular type of embossing desired is engraved on the rollers, for such purposes.

In order that those skilled in the art to which my invention appertains may better understand the same, I will now proceed to briefly describe, in conjunction with the annexed drawings, a preferred method of producing in connection with a fabric grid and a chemical mixture or compound containing a metallic material and gum or sizing or both, the said product structure when mechanically finished.

The fabric grid is first bleached and then sized with a solution of the consistency of a liquid paste, and composed of farina, potato or other starch mixed in water, in about the proportion of one pound of farina, potato or other starch with one gallon of water, as furnishing a good working formula. The above sizing solution is applied by mangle rolls in order to force the sizing in, about and over the warp and weft of the fabric grid, and then dried. The sizing is applied preferably to one side only at a time and afterward to the other side, as it is found thereby the fibers of the grid are more generally given an opportunity to straighten out and thus ultimately to furnish the desired degree of opacity in the resultant product structure. After sizing the grid is dampened and then calendered and is thereby brought to a condition to receive the metallic mixture or compound, with the gummy composition. The metallic mixture or compound consisting of bronze, aluminum, silver or other salts of metals. The aluminum is used preferably in powdered form and the gum used is either tragacanth or dextrin. The said metallic mixture or compound is prepared preferably as follows:—The gum is first mixed in the proportion of one part of water to three of canary dextrin or gum tragacanth. This is dissolved in warm water and when thoroughly dissolved, 70 lbs. of this solution is combined with 30 lbs. of water, making 100 parts of the gummy composition in a solution form. The above metallic mixture or compound with the gummy composition, in solution are then prepared for use, as follows:—

100 lbs. of gum-solution
 120 " " metallic salts or aluminum
 120 " " farina or other starch sizing
 3 " " borax.

This mixture is then boiled for about three to five minutes and warm water added until making 100 gallons of the combined solution of the consistency of a viscous liquid pasty mass, care being taken to have the several ingredients thoroughly mixed, before using. The aforementioned sized fabric grid is now passed through a trough containing the said mixture or compound under the influence of heavy rolls and between which it is drawn, forcing thereby the said mixture or compound thoroughly into the warp and weft and over the surface of the previously sized fabric grid with removal down almost to the grid of surplus, so as to become thereby a unitary, inseparable, homogeneous structure by the mechanical operation to which it is subjected; and moreover in which, by the above treatment the opacity of the product structure is rendered complete. The said defined product structure thus derived is then thoroughly dried and then calendered. In this state the product is in a highly desirable condition to be embossed, which is accomplished by the passing of the produced article between engraved heavy rollers from which the article receives the imprint thereof onto the same. The character of the embossing will vary with the character of the rolls employed for the said purpose. The said product either after being embossed or if not embossed after being treated as above mentioned and dried and calendered, in unlimited length as well as width may then be rolled and shipped as it is ready for its various uses.

In the drawings $a$, in Fig. 1, represents a fabric or fabric grid for being sized and then supplied with a metallic mixture or compound with a gummy composition, to provide in its mechanically finished state, an inseparable, flexible, homogeneous, opaque structure.

$b$, in Figs. 2 and 3, represents the mechanically built-up, flexible, homogeneous and opaque product structure.

$d$, $e$ and $f$, respectively, in Figs. 4, 5 and 6, represent the different types of embossing of the finished, inseparable, homogeneous and opaque product, for various uses. The embossing of the product being accomplished after the inseparable, flexible, homogeneous and opaque structure has been mechanically completed.

The product may be given a hard, smooth or even enamel sheen on either or both sides by means of suitable calendering rolls, or embossed, as shown in Figs. 4, 5 and 6, so as to provide surfaces with fine grooves or embossed striations to thereby in use permit rays of light to be deflected at an angle to an optical plane say, at an angle of 25°, to the screen, whereby the illumined image of the object projected or printed can be seen more brilliantly, than directly in front of the screen. This is due to the fact that rays of light are deflected to the right and left in larger volume than from an ordinary plain unbroken flat surfaced screen. It may be here remarked that it is impossible to obtain with any satisfactory results embossed effects in ordinary coated screens, such as above disclaimed, because when heavy rolls are applied to a coated base, which is necessary to emboss the same, the surface coating of the base subsequently peels off as soon as broken by the corrugations of the rolls of the embossing step. When both surfaces of the fabric-grid 'a, as well as interstices are filled alike and the structure is rendered entirely opaque, the action of light on such a structure is much more effective than upon a surface coated screen having but one side coated, for use.

The said product structure is well adapted for advertising purposes among other applications thereof, and when printed upon configurations, lettering or like matter will stand out in bold relief due to the character of the structure, and in a manner quite different from what it does on simply coated structures. Moreover is avoided peeling and cracking of the surfaces, as is the case in the use of coated products

Having thus described the nature and objects of my invention, what I claim as new and desire to secure by Letters Patent is:—

1. As an improved article of manufacture, a product structure, consisting of a fabric grid having a mixture or compound of a metal or metallic salt with a gummy composition combined in, over and filled into the fabric grid to render inseparable the fabric grid from the mechanically applied composition, thereby providing a resultant product in a flexible, homogeneous, opaque condition.

2. As an improved article of manufacture, a product structure, consisting of a sized fabric grid having mechanically a paste-like mixture of a metal or metallic salt, with a gummy composition combined in, over and filled into the fabric grid to render the latter inseparable from the mechanically applied composition, thereby providing a resultant product in a homogeneous opaque condition.

3. The improved method of making a product structure, which consists in sizing a fabric grid and drying, then mechanically filling a composition consisting of a metallic matter and a vegetable preparation combined, in and over the grid in a paste-like form, so as to render inseparable the fabric grid from the mechanically applied composition and then drying the product, to provide a homogeneous opaque structure.

4. The improved method of making a product structure, which consists in mechanically filling a sized fabric grid with a metal or metallic salt and a gummy-preparation in a paste-like form combined in, over and filled into the fabric grid so that the latter is inseparable from the mechanically applied composition thereto, then drying the product and finally embossing the same.

5. The improved method of making a product structure, which consists in filling a fabric grid with a size solution, drying and calendering, then mechanically impressing in and over the surface of the fabric grid a metal or metallic salt in solution with a gummy composition so as to become an inseparable part of the fabric grid, then drying the product and finally calendering the same to bring into a flexible, homogeneous and opaque condition.

In witness whereof, I have hereunto set my signature in the presence of the two subscribing witnesses hereto.

HENRY S. WILLIAMS.

Witnesses:
 MORRIS EARLE,
 W. A. JOHNSON, Jr.